United States Patent
Edwards (10) Patent No.: US 6,557,995 B1
(45) Date of Patent: May 6, 2003

(54) TEMPORARY, DISPOSABLE GLARE SHIELD FOR EYEGLASSES

(76) Inventor: James L. Edwards, 5196 41st Street South, St. Petersburg, FL (US) 33711

( * ) Notice: Subject to any disclaimer, the term of this patent is extended or adjusted under 35 U.S.C. 154(b) by 0 days.

(21) Appl. No.: 10/043,012

(22) Filed: Jan. 11, 2002

(51) Int. Cl.⁷ .................................... G02C 9/00
(52) U.S. Cl. ............................... 351/47; 351/44
(58) Field of Search .................... 351/41, 44, 47, 351/57; 2/15, 12, 13

(56) References Cited

U.S. PATENT DOCUMENTS

| | | | | |
|---|---|---|---|---|
| 3,033,359 A | * | 5/1962 | Mercer | 351/47 |
| 4,217,037 A | * | 8/1980 | Lemelson | 351/44 |
| 6,113,233 A | * | 9/2000 | Miller | 351/46 |

FOREIGN PATENT DOCUMENTS

| | | | | |
|---|---|---|---|---|
| EP | 0 424 166 | * | 4/1991 | 351/47 |
| JP | 5-34648 | * | 2/1993 | 351/47 |

* cited by examiner

*Primary Examiner*—Huy Mai (57) ABSTRACT

Temporary, disposable glare shields made of thin flexible tinted plastic film, consisting of a set of two for left side and right side of eyeglasses, self-adhered to eyeglass outer surfaces, extending beyond frame perimeters and around both temporal sides thereby completely shielding all adjacent areas surrounding eyes from potential harmful sunlight UV and other components injurious to sight. In addition, such glare shields provide protection against harmful airborne hazards, strong wind, insects, pollution, contaminants and toxins that may otherwise impact eyes. Said glare shields are a size and shape that substantially fit all sizes and shapes of eyeglasses. They may also be worn directly on the face to cover eyes without eyeglasses, or be worn in this latter way with eyeglasses worn over said glare shields thus providing the sealed peripheral protection of glare shields and the visual improvement of prescription eyeglasses. A convenient pocket-size stowage folder is provided with each set of glare shields that gives instructions for use and may be used to store glare shields after use when and if needed again.

12 Claims, 3 Drawing Sheets

TEMPORARY, DISPOSABLE GLARE SHIELD FOR EYEGLASSES

FIELD OF INVENTION

This present invention relates to improved temporary glare shields for eyeglasses and the like, and more particularly to glare shields in the form of inexpensive, disposable, lightweight thin plastic film having a shape and size that fits all shapes and sizes of eyeglasses and the like. This invention is self-adhered to eyeglasses and the like, and contains properties of tint that filter harmful UV and infrared rays, and provides complete peripheral protection from all potential sources of harmful sunlight properties, glare, airborne hazards, insects, contaminants and toxins. It may also be adhered directly to the face to protect eyes of persons not wearing eyeglasses.

DESCRIPTION OF RELATED PRIOR ART

A variety of arrangements exist that convert eyeglasses into sunglasses. As a result of my search of past United States Patents for relevant prior inventions the following patents have been disclosed:

above and below eyeglass frames, as well as at the temporal sides. Some efforts disclose special attempts to remedy certain potential visual problems present in the workplace or resulting in prolonged computer use. One attempt has to do with half-lenses that is inadequate when applied to other lenses. And, in other cases, non-transparent "side-blinders" are employed to shield bright light, airborne objects and other contaminants. In many such efforts temporary shields are used that only protect the limited area of host eyeglass lenses, allowing other surrounding regions to be exposed to the aforementioned hazards. And, in many cases, these efforts offer impractical solutions that are unaesthetic and bulky, and prove to be highly inconvenient.

For example, U.S. Pat. No. 111,494 to E. K. Madan on Sep. 27, 1938 discloses a design for sunglasses that is permanently attached to a spectacle frame, having front and side shade members. The disadvantage with this Madan invention is that it adds a disproportionate amount of weight to the front of the spectacles and would likely cause them to slide down the nose of the wearer. This potential problem would require frequent adjustment to maintain the proper positioning of spectacles on the face of wearers. The added device is permanently attached and cannot be conveniently

| U.S. Pat. No. | Date | Inventor | Invention |
| --- | --- | --- | --- |
| D111,494 | 9/27/1938 | E. K. Madan | Sunglasses |
| 2,388,626 | 11/6/1945 | E. I. Wilson | Eyeglasses, Shield, or the like |
| 2,511,329 | 6/13/1950 | E. Craig | Lens Shield |
| 2,714,717 | 8/9/1955 | A. D. Allman | Glare Shield and Alternate Eye Shade for Spectacles |
| 2,759,394 | 8/21/1956 | D. L. Evans | Glare Shield for Spectacle Lens |
| 3,033,359 | 5/8/1962 | S N. Mercer | Disposable Lens Shields |
| 3,171,134 | 3/2/1965 | D. J. Kennedy | Sunshield for Eyeglasses |
| D.208,069 | 7/11/1967 | S. Boxer | Pair of Clip-on Sunglasses |
| 4,217,037 | 8/12/1980 | J. H. Lemelson | Eyeglass Shields |
| 4,338,004 | 7/6/1982 | G. W. Vosper | Snap-In Lens for Glasses |
| 4,726,975 | 2/23/1988 | M. T. Hinrichs | Disposable Side Shield for Eyeglasses |
| 4,797,956 | 1/17/1989 | E. L. Boyce | Eye shield |
| 4,973,148 | 11/27/1990 | A. E. Gazeley | Optical Accessory for Use With Spectacles |
| 5,321,443 | 6/14/1994 | R. E. Huber | Removable Sunglass Assembly for Attachment to a Conventional Eyeglass Assembly |
| 5,388,269 | 2/14/1995 | B. P. Griffin | Eye Shield Apparatus and Method |
| 5,394,567 | 3/7/1995 | R. O. Vatterott | Universal Side Shield |
| 5,402,189 | 3/28/1995 | V. L. Gill | Side Shield for Eyeglasses and Method of Making Same |
| 5,502,516 | 3/26/1996 | W. B. Elterman | Disposable/Reusable Sun Filter |
| 5,555,038 | 9/10/1996 | S. M. Conway | Unitary Lens for Eyewear |
| 5,614,963 | 3/25/1997 | C. D. Parker | Sun Shield System for Protecting the Eyes From UV and Infrared Components of Sunlight |
| 5,617,153 | 4/1/1997 | L. L. Allen | Eyeglass Lens Shield Having Peripheral Band |
| 5,694,192 | 12/2/1997 | S. Lucki | Clip On Lens Assemblies for Eyeglasses |
| 5,694,240 | 12/2/1997 | J. H. Sternbergh | Multilayer Anti-Reflective and Ultraviolet Blocking Coating for Sunglasses |
| 5,740,560 | 4/21/1998 | F. J. Muoio | Non-Fouling Eyewear for High Pollution Environments |
| 5,764,333 | 6/9/1998 | J. R. Somsel | Sunshields for Eyeglasses |
| 6,003,990 | 12/21/1999 | N. Einhorn | Press-on Lenses for Relieving Computer Related Eye Problems |
| 6,113,233 | 9/5/2000 | R. G. Miller | Lens Cover System |

Of the many attempts made to convert existing eyeglasses into sunglasses, all fall short in providing complete, low-cost, practical, and convenient temporary sun shield protection, particularly in those areas of peripheral vision removed when not needed. This Madan invention appears to be costly and is obviously not disposable. Although this devise shields areas in the front and sides, there are certain areas where sunlight will impact eyesight from above and below the frames. When assembled, this device cannot be stored in a conventional eyeglass case.

Another example, U.S. Pat. No. 2,388,626 to E. I. Wilson on Nov. 6, 1945 discloses an eyeglass shield in which the shield members are attached to the top of spectacle frames by a metallic hinge that allows adjustment to any angle or tilt. This Wilson invention is described as being composed of flexible sheet material, transparent, opaque or translucent and in another instant it is described as colored transparent material that shields the wearer from undesirable light rays.

Significant differences exist between this Wilson invention and my invention. For example, the Wilson sunshield is not a temporary device, and is not disposable because of its permanent attachment to eyeglass lenses. The added cost of this permanent attachment by itself makes this device not disposable when temporarily used as a sunshade.

In addition, considerable weight is added to the front of host eyeglasses that undoubtedly would cause this assembled device to slide down the nose of wearers and require frequent adjustment to maintain its proper position. The present invention does not create disproportionate weight to be added to the front of eyeglasses.

Another example, U.S. Pat. No. 2,511,329 to E. Craig on Jun. 13, 1950 discloses a lens shield consisting of thin flexible transparent material that is stuck to a spectacle lens to reduce glare and undesirable rays of the sun. It is adhered to eyeglass lens by an adhesive on one side of said material so that it conforms to the shape of the lens. Craig's disclosure states that this shield may be removed when not needed and carried in a packet with other shields to be used again.

A tab is described that is positioned on each shield to single-out each layer of shield in the packet. But, the likelihood of these shields sticking together exists, as the adhesive needed for each shield within the packet has no differentiation to identify the top shield being removed from others beneath it in the packet. This creates a potential problem of lifting several shields from the top of the stack when only one is needed, even though the top tab is grasped, And, since left and right eyeglass lenses are rarely the same shape, and are instead a mirrored image of each other, two such packets are required. One of these will contain left side shields and the other will contain right side shields. A potential problem of left and right shields becoming intermingled exists.

It should be noted that the present invention provides left and right side glare shields that are individually stowed in a handy pocketsize folder comprised of a set of two. There is never a problem of several glare shields sticking together. These are a shape and size that substantially fit all shapes and sizes of eyeglasses.

Yet another disadvantage with the Craig invention exists with the likelihood of glare entering eyesight from above and below eyeglass frames in the front as well as at the side temporal areas. The present invention provides complete glare protection above and below eyeglass frames and without a breach continues this protection at the sides around each temporal area.

Another example, U.S. Pat. No. 2,714,717 to A. D. Allman on Aug. 9, 1955 discloses a glare shield and eye shade for spectacles that are clipped on to eyeglasses that contain a hinge assembly that allows them to be raised or lowered when shielding glare. The Allman invention claims use of a pair of spaced hinges and an attachment using two clip-on hooks as a means of attachment to the lens rims. A disadvantage can be identified with this means since all shapes and sizes of eyeglasses will not fit the requirements to use this device, and use is limited to only those eyeglasses having a lens rim of the proper size required.

A further disadvantage is found in the shape of the Allman eye shades, as they do not extend above and below the eyeglass illustrated, as well as not providing protection at both temporal sides.

Another example, U.S. Pat. No. 2,759,394 to D. L. Evans on Aug. 21, 1956 discloses a glare shield for spectacle lenses in the form of a sheet of selectively transparent material that is applied to a spectacle lens by means of pressure sensitive adhesive. In doing so, the optical clarity of the lens is said to be substantially unaffected. Another claim is made that this is a type of shield that only a minimum number of different shapes and sizes are required for fitting the wide variety of shapes and sizes of eyeglasses currently in use. This claim gives rise to an obvious problem that is illustrated in FIG. 1 through FIG. 3 of the Evans' drawings. It shows specific shapes and sizes of glare shields fitted snuggly within two spectacle frames, which should not be considered to be typical of the range of varied shapes and sizes in use. It is highly unlikely that such illustrated examples given can support the claim that only a minimum number of shapes and sizes are required to meet this vast marketing claim.

In addition, Evan's states in his disclosure, "If the shield of my invention is made of cellulose acetate or any material moldable when heated, any ordinary forming technique may be employed to mold it into the curved-convex shape desired." He further discloses, "a sheet of cellulose acetate may be heated to its softening temperature, which may be above boiling point of water for example. This stretched down over a convex mold having approximately a spherical curvature slightly greater than the curvature of the lens with which it is to be used."

There are a number of problems in these statements that someone having knowledge of plastic materials and molding of plastics can recognize. For example, Evans suggests use of thermoplastic material, the kind that may be molded again and again if heated, rather than the thermosetting plastics, the kind that cannot be molded again when heated. His use of a thermoplastic would create a problem if his sunshields were subjected to the heat of direct sunlight. They would become moldable plastic again, and tend to sag and assume an undesirable shape.

Secondly, there is no advantageous reason to construct glare shields having a "spherical curvature slightly greater than the curvature of the lens." In fact, his molding method will create a small space or pocket between the shield and lens, which would be prone to accumulate moisture through the process of condensation when humid ambient conditions are present.

And, further, users of these glare shields must prepare them so they fit a specifically required shape and size host eyeglasses. This is a highly inconvenient requirement that likely would be avoided by those needing sunglasses.

Another example, U.S. Pat. No. 3,033,359 to S. N. Mercer on May 8, 1962 discloses a disposable less shield made of tinted transparent plastic that adheres to eyeglass lenses by electrostatic attraction. It distinguishes itself from others by featuring this electrostatic method of attachment rather than clip-on devices and other adhesive methods. It is claimed that self-adhesive methods of attachment cause residue to remain on the lenses and attract dust and other foreign matter. It is also claimed that glare shields using adhesives are "difficult to package and handle, and are tricky to place properly on the eyeglass lens." And, it is claimed that use of self-adhesives add to the cost of glare shields.

But, these negative claims are not credible, as self adhesive applications have been perfected in recent years that do not leave any residue on a host surface, and these applications are well established as a preferred method for a wide range of products, namely postage stamps. The small cost of using self-adhesives is far outweighed by the savings realized by this preferred method.

Further disclosed is a packaging method designed to hold a number of these Mercer lens shields, which is illustrated as a "match book" type container. And, a lens cleaning tissue is supplied with this container which serves also as a tissue that is used to smooth wrinkles of the thin shield when it is applied to eyeglass lenses. These procedures can hardly be considered convenient, and must be performed whenever the Mercer lens shields are applied. It can be said that a working surface of some kind is required when placing these shields on to eyeglass lenses, which may not be available at times when outdoor bright sunlight is to be avoided.

In addition, this Mercer device does not prevent glare from entering eyesight from above and below eyeglass frames in frontal areas and at both peripheral areas at the side temporal regions.

Although this Mercer disclosure expresses the need for an economical and disposable eyeglass shield for public use that is low cost and can occupy little space in a pocket or handbag, thereby making it convenient for many situations, it falls short in meeting all of these requirements.

Another example, U.S. Pat. No. 3,171,134 to D. J. Kennedy on Mar. 2, 1965 discloses unitary sun shields for eyeglasses that claim to be detachable. It also claims to provide maximum protection against sun glare by extending protection below the frames in the front and around at both side temporal areas. This unitary device is positioned on the inner side of eyeglasses between the lenses and eyes of wearer and is snapped into this position at the top of eyeglass frames. Although this Kennedy invention protects a greater area of eyesight than most other related art, it fails to shield eyesight above eyeglass frames as illustrated in drawings FIG. 5, showing an aperture between No. 28 and No. 12.

In addition, this snap-on device is not disposable and is obviously more costly than my present invention. It should also be noted that the Kennedy invention requires eyeglass frames that accept the specifically shaped snap-on feature, and if the eyeglass frame is too large it cannot be engaged, and if too small the sunshield will be loose and likely fall off.

Another example, U.S. Pat. No. Des. 208,069 to S. Boxer on Jul. 11, 1967 disclose the design of a pair of clip-on sunglasses. This design patent shows a method of attachment using two clips that appear to be metallic that fit over eyeglass frames near the bridge of the nose. Two hinges are located on both sides so that they hold extensions of similar shield material in position along the temporal sides at right angles to the front shields. Since this is said to be an ornamental design patent, no disclosure is made of its function. But, from the limited drawings given this design seems not to be disposable, and is comparatively costly. No disclosure is made regarding tinting of the material used for shields, and any comment regarding sun-shielding capacity would require assumptions that may or may not be true.

This Boxer design would not fit all shapes and sizes of eyeglasses, limiting its use to those that fit this clip-on feature, as well as that distance from hinge to hinge between each side.

Another example, U.S. Pat. No. 4,217,037 to J. H. Lemelson on Aug. 12, 1980 discloses eyeglass shields that are used by those wearing half-lens eyeglasses. These shields extend above half-lenses in the front only, and provide no glare protection at the sides. Additional requirements of many shapes and sizes of half-lens eyeglasses impose severe restrictions to the locations of attachment means, which must be molded during manufacture of these shields. There is very little accommodation for the many sizes and shapes of half-lenses, except lateral adjustment.

These half-lens shields are not disposable, and cannot be carried in the host eyeglass case unless dismantled.

The present invention is not limited to half-lens eyeglasses, although they will function well when attached to any shape and size half-lens eyeglass.

Another example, U.S. Pat. No. 4,338,004 to G. W. Vosper on Jul. 6, 1982 discloses snap-on lenses for eyeglasses that require a groove to be placed in the nose contacting surface and the adjacent frame locations to secure resilient, flexible, colored transparent plates behind each eyeglass lens. But, this device does not shield eyesight from above and below lens, and the peripheral temporal areas are left unprotected.

In addition, this Vosper invention is not disposable, and requires permanent renovation of regular eyeglasses to accommodate installation of these shields.

Another example, U.S. Pat. No. 4,726,075 to M. T. Henrichs on Feb. 23, 1988 discloses disposable side shields for left and right sides of eyeglasses. These side shields cover the area between lens and eyes of the wearer to wind, dirt, and the like. But, no claim is made that these eye shields protect against bright sunlight and other glare, as these are made of leather, cloth, vinyl or the like; and therefore, they are not described as transparent, thus making this invention of limited relevancy to the present invention.

A disadvantage with these Henrichs' side shields occurs when they are worn by anyone operating a moving vehicle because of restrictions created by these devices on their field of vision. There is a high probability that wearing these "side-blinders" will cause a vehicular accident as the result of not being able to see hazards within their normal field of vision.

Another example, U.S. Pat. No. 4,797,956 to E. L. Boyce on Jan. 17, 1989 discloses a transparent eye shield, which is used singly or in conjunction with a protective face mask. It claims to provide eye protection from small objects and harmful or contaminating fluids, which might otherwise contact eyes. This invention does not claim to shield harmful rays of the sun or other bright light, although it does describe a variation that is tinted to protect eyes from the bright flash from welder's torches. This limited variation in protection is not claimed by the present invention, and therefore has no comparable relevancy.

It also claims to be disposable, based upon its low cost. But, since this device is used primarily in industrial, medical and academic applications, the cost of use and disposal is absorbed into those productive applications and can be defrayed within such value added processes. But, this Boyce invention cannot be considered disposable for the average wearer of eyeglasses when worn as a temporary glare shield as it bears a cost factor that cannot be ignored.

Another example, U.S. Pat. No. 4,973,148 to A. E. Gazeley on Nov. 27, 1990 discloses an optical accessory for use in combination with spectacles with an arrangement that provides a releasable attached accessory that connects such optical members in a spaced apart relationship. Although this Gazeley invention claims to be a sun shade device, it does not protect eyesight from sun light from above and below the attached device, as well as sun light at the temporal sides of eyeglasses as does the present invention.

Another example, U.S. Pat. No. 5,321, 443 to R. E. Huber on Jun. 14, 1998 discloses a removable sun glass assembly that is attached to conventional eyeglasses. Although this Huber invention shields eyesight to some degree below eyeglasses and at the sides, it does not provide this protection above eyeglasses and therefore should not claim to provide complete peripheral protection at all potential areas of sunlight. It addition, it should not claim to be generally disposable, but rather disposable at considerable cost.

Another example, U.S. Pat. No. 5,388,269 to B. P. Griffin on Feb. 14, 1995 discloses an eye shielding apparatus that substantially encloses all regions of the left and right eyeglass lenses. Claims stated in Column 7, numbers 6 and 10, describe this eye shielding apparatus as consisting of thermoplastic material, which must be assumed to be transparent although not so disclosed. Thermoplastic material can be reformed when reheated. It is thermosetting plastic than retains its shape even when reheated. The Griffin sunglass assembly would not retain its original shape if exposed to intense sunlight environments, as they are made of thermoplastic material.

Another disadvantage with the Griffin invention is that no reference is made that it is tinted or has glare protection and must therefore have no special protection against bright glare or sunlight hazards. And, since it is mounted on a pair of regular eyeglasses, it does not extend protection above, below and at the temporal sides, with the shape and size of such eyeglasses establishing the limits of protection. The shield is limited to the area of the eyeglass lens.

Another example, U.S. Pat. No. 5,394,567 to R. O. Vatterott on Mar. 7, 1995 disclosed shields for application to temple bars of eyeglasses that protect user eyes from wind, dust, and debris, with particular emphasis to such sources from above. This Vatterott device does not claim to protect eyes from bright sunlight and the like. And, it is not disposable. It should not be considered to have meaningful relevance to the present invention.

Another example, U.S. Pat. No. 5,402,189 to V. L. Gill on Mar. 28, 1995 discloses a side shield for eyeglasses and a method of making same. It includes use of a metal foil shape retentive member sandwiched between two additional layers of material that are also not transparent. These side shields are placed on the eyeglass stems next to the wearer's temple regions and are claimed to block peripheral light and wind.

A disadvantage exists when these side shields are worn by an operator of a moving vehicle, such as an automobile, truck, boat, or aircraft, and the like, since all vision on either side is blocked by these side shields. This disadvantage is also present when wearing these side shield during times when a person is jogging or walking near highway traffic, as well as when cycling, skiing, roller-blading, or any occasion when someone finds it necessary to be aware of hazards from nearby activities. These Gill devices cause such wearers to be exposed to hazardous risks resulting from their restricted field of vision.

Another example, U.S. Pat. No. 5,502,516 to W. B. Elterman on Mar. 26, 1996 discloses a disposable/reusable sun filter, or light shield that includes a relatively thin but rigid body of light permeable material. This material is mounted directly on the outside of each eyeglass lens using an adhesive that minimizes optical interference by being placed at certain locations on the shield. It is said that the body of this shield has a thickness of between ¼ millimeters and 4 millimeters, claiming a range of shapes, thickness and mountings on eyeglass lenses so as to provide prescription corrections. A further object of this invention is to provide for conversion of non-prescription glasses into reading or bifocal eyeglasses. The present invention claims no optical correction or conversion and should not be considered relevant to this Elterman invention.

Another example, U.S. Pat. No. 5,555,038 to S. M. Conway on Sep. 10, 1996 discloses a unitary lens for eyewear that provides improved aerodynamics, aesthetic appearance and eye protection for sportswear applications. It is claimed that this invention intercepts peripheral light for improved vision during sports activities and accomplishes this claim by the close fit to the wearer's head.

A disadvantage develops with this claim for those who wear eyeglasses of a style and size that do not fit closely to the wearer's head, or are overall too large to allow a close fitting Conway device. This restricts this invention to those who either do not wear eyeglasses and those who wear eyeglasses that accommodate such invention.

Another disadvantage is the difficulty of stowage of this invention. It is not disposable, and must be stored in a special protective cover of some sort. And, it is obviously more expensive than my invention and appears to be limited to those engaged in certain outdoor sports activities.

Another example, U.S. Pat. No. 5,614,963 to C. D. Parker on Mar. 25, 1997 discloses a detachable sun shield for protecting eyes from U. V. and infrared components of sunlight. One major disadvantage with this invention is that it requires modification of standard eyeglass frames in order to attach the device. And, it is not disposable, and requires a special stowage case when not in use.

Another disadvantage is that it obviously would place a disproportionate amount of weight to the front of eyeglasses and cause them to slide down the nose of wearer. This would require frequent annoying adjustment by the wearer to keep this sun shield in its proper position.

Although it is stated that these sun shields can be placed on standard prescription eyeglasses, required modifications appear to be extensive although described as "slight modification".

Another example, U.S. Pat. No. 5,617,153 to L. L. Allen et al, on Apr. 1, 1997 discloses a lens shield overlying the outer surface of eyeglass lens consisting of a thin sheet of polymer material with the "molecular structure of the eyeglass lens". It is further stated that such shields are held in place on the eyeglass lens by means of "adhesion" of the type that holds molecules of unlike substances together. It is assumed that Allen is describing magnetic attraction.

A problem exists in these statements, which is first identified in the statement that the polymer material has the same molecular structure as the eyeglass lens. In fact, they do not. Allen is probably trying to say that the polarity of each of these components have an attractive adhesion, meaning that they would be of opposite polarity, which does not imply they have the same molecular structure.

Secondly, he describes such adhesive force as limited to a "peripheral band", shown in FIG. 3, said to be "5 mm" in width. Not only are these descriptions of adhesion questionable, but there is no logical reason to limit the adhesive force to a peripheral band.

My invention has no such problem, as it employs a state-of-the-art self-adhesive material that does not cause any variation in optical characteristics of host prescription eyeglasses.

In addition, this Allen invention limits any shielding protection to the area of the host lenses. Glare and hazardous rays of the sun can reach eyesight from above and below, as well as at the temporal sides of eyeglasses. The present invention protects eyesight of the wearer at all peripheral areas above, below and at both sides.

Another example, U.S. Pat. No. 5,694,192 to S. Lucki et al. on Dec. 2, 1997 discloses a clip-on tinted lens assembly for eyeglasses. The tinted lens is described as having a "circumferential" groove, in which is placed a tension thread. Clips are mounted on the tension thread, and extend outward to engage the frame of an eyeglass in a proper position. It is said that these lens modify "prescription eyeglasses" to compensate for differing light conditions. But, these tinted attachments have a disadvantage since they are limited to the size of the host eyeglass frames and do not extend shielding protection above and below the front of eyeglasses, as well as providing no protection at the temporal sides. Bright glare and sunlight are not shielded at locations beyond the edge of host eyeglasses.

This Lucki invention is not disposable, and is obviously more costly than other such devices.

Another example, U.S. Pat. No. 5,694,240 to J. H. Sternbergh on Dec. 2, 1997 discloses a sunglass having a multi-layer coating on a concave rear lens surface claimed to reduce transmission of UV radiation and allowing desirable transmission of certain visible light rays. But, there is no reference given to the size, style and function of eyewear used. This invention does not extend light-shielding protection for any of the peripheral areas of eyeglasses, above, below and at the temporal sides.

Another example, U.S. Pat. No. 5,740,560 to F. J. Muoio on Apr. 21, 1998 discloses protective goggles which consist of transparent protective members made of a polarized lens for reducing glare and to provide protection against flying objects and airborne contaminants, UV radiation, and other hazards. This invention stresses protection against eye injury, but also gives emphasis to such protective members being adhered to both sides of eyeglass lens thus covering the inside of lenses. In doing so, Muoio acknowledges the likelihood of airborne hazards impacting the inside surface of eyeglass lenses. This same likelihood exists for airborne hazards that will impact eyes, since that area remains unprotected to hazards entering at both peripheral temporal sides. This is a major disadvantage that does not exist with my invention. In fact, my invention extends protection above and below eyeglass frames, and at the sides, providing a complete barrier to airborne hazards.

Rather than place additional shield film over a first layer, as is the case with this Muoio invention, only one layer is used for the present invention, which may be discarded if desired after the temporary hazard has ceased.

Another example, U.S. Pat. No. 5,764,333 to J. R. Somsel on Jun. 9, 1998 discloses a method and kit for making sunshields for eyeglasses from thin plastic sheets, and a kit which includes a special container for these sunshields.

The method of making these sunshields requires the maker to follow a process that first scribes an outline of the lenses onto a sheet of writing paper. Then they must cut this outlined design from that sheet so as to create a template with which the size and shape of the lenses can be duplicated on to a thin plastic sheet. This duplication is then cut from the plastic sheet to make the sunshield, which is said to adhere to each eyeglass lens by "electromagnetic radiation". (Which is commonly called, "electrostatic attraction"; a method employed by other prior arts to hold a plastic sunshield to the surface of eyeglass lenses.)

A disadvantage with this method can be identified in its complicated manufacturing process, as it requires a number of steps to construct each left and right lens cover. In order to meet the requirement of a sun shield the resulting size and shape must be flawless, otherwise a breach will occur that allows bright light to enter the wearer's eyesight. This is an even greater hazard when such light occurs by surprise, and could startle wearers of this Somsel method when operating a motor vehicle, or involved in a sports activity or the like.

In addition, it is claimed that such Somsel shields are made of a polarized plastic film of either polyethylene, polystyrene or polyester types, which commonly is known to have varied polymerization of monomers, each with varied electrostatic properties. These variations may not provide consistent reliable adhesion.

Further, the present invention uses a well proven method of self-adhesion that can be relied upon under all extreme conditions, indoors and outdoors; and does not impart any optical variance in vision as many proponents of electrostatic adhesion would like to indicate. Further, the present invention does not require being made by the wearer; and there is no possibility of breaches or gaps being created by imperfections in the pattern/ cutting process. The present invention is distributed in a "ready to apply" packet, in a shape and size that fits all eyeglasses and supplies a continuous shield above, below and at both sides of eyeglasses. It is a simple, effective, low cost, disposable glare shield with wide applications.

Another example, U.S. Pat. No. 6,003,990 to N. Einhorn on Dec. 21, 1999 discloses a temporary lens for attachment to prescription eyeglasses by means of electrostatic force, which contains optical components in a unique combination to relieve visual problems associated with prolonged computer use.

The object of this invention is not related to those of my invention, as there are no optical components found in my device. Instead, the present invention gives emphasis upon not having any optical components that may interfere with host prescription eyeglasses.

Another example, U.S. Pat. No. 6,113,233 to R. G. Miller describes a lens cover system that includes certain tools, materials and instructions for making the same, along with a storage system. As disclosed by Somsel, this Miller invention also describes a required procedure for making this lens cover system. Certain disadvantages can be identified with the Miller device that reduce its relevancy to a negligible degree. The Miller system produces a lens cover that is limited to the same shape and size of host eyeglasses, and by doing so allows glare, sunlight and the like, including airborne hazards and contaminants to reach the wearer's eyes from above, below and at each temporal side. The present invention does not have these disadvantages since all peripheral areas above and below the frames and at the left and right sides are completely shielded from such hazards and contaminants. One shape and size glare shield fits all shapes and sizes of eyeglasses. And, it does not require being constructed in advance, but instead is ready for immediate use when and where temporarily needed.

These difficulties, problems and disadvantages of prior art are overcome by the present invention in novel ways that are simple, inexpensive and efficient, while providing better and more advantageous results.

SUMMARY OF INVENTION

The present invention remedies the above described deficiencies of prior art, providing novel and improved temporary glare shields that completely protect eyesight from glare, sunlight and other forms of bright light. Such glare shields protect eyesight not only within the area of eyeglass lenses, but also throughout peripheral areas above and below eyeglass frames in the front as well as left side and right side temporal areas. Said glare shields also provide protection against airborne hazards, flying insects, contaminants and strong wind. A distinct advantage is provided by this invention is that one shape and size substantially fits all shapes and sizes of eyeglasses. These light weight glare shields do not add excessive weight to eyeglasses and do not cause them to slide down wearer's nose. The present invention is a low cost, temporary and disposable glare shield that has particular advantages for those who are exposed to previously stated hazards as workers, spectators and participants in many outdoor activities. It has special application to those who serve in the military with particular efficiencies in distribution, use and disposal.

This present invention is easily adhered to the exterior of eyeglasses by means of clear self-adhesive that causes no optical variation and allows removal without leaving any adhesive residue. Such glare shields can be reused, and stowed in the handy packet folder provided until temporary need arises again.

OBJECTS AND ADVANTAGES

Accordingly, it is a primary object of the present invention to provide a glare shield attachment to the exterior of eyeglasses that substantially protects eyesight at all areas of potential entry of sunlight, glare and other bright light, that is made of flexible tinted plastic sheet material with UV filtering properties.

It is another object of the invention to provide such glare shield at a low cost, so that it is disposable after temporary use or may be used again and again.

Another object of the invention is to provide lightweight glare shields for attachment to eyeglasses that will not cause them to slide down the nose of wearer.

A further object of the invention is to provide a simple, convenient folder packet for stowage of such glare shields before and after they are temporarily used of a size that will fit into a shirt or jacket pocket.

Yet another object of the invention is to provide the means of self-adhesion of such glare shields that does not cause any optical change in visual characteristics to host eyeglasses and does not leave any adhesive residue on lenses when shields are removed.

And, another object of the invention is to provide glare shields of a shape and size that substantially fits all shapes and sizes of eyeglasses.

Another advantage of the current invention is that it provides an effective eye shield for eye patients who have had their eyes dilated during examination by optometrists and require temporary protection against bright light, particularly sunlight, during the time their eyes are dilated. The low cost of this glare shield allows optometrists to provide their eye patients with this temporary protection as a "handout."

Another object of the present invention is to provide glare shields that also protect eyesight against airborne hazards, flying insects, contaminants and strong wind.

Still another object of the present invention is to provide temporary glare shield protection that can be conveniently distributed by venders at outdoor events or vending machines. This includes outdoor activities such as parades, sports events held in stadiums, racetracks, and wherever spectators are assembled under the sun.

Activities at the beach, golfers, hikers, automobile drivers, truckers, bus drivers, farm workers and field hands, military personnel, in fact any activity where people are outdoor participants at work or play and find temporary sun protection is needed can use this present invention to their distinct advantage.

Another advantage of the present invention is to provide glare shields that may be applied to eyeglasses in multiple layers of protection, noting that in certain extreme conditions of bright light additional glare shields may be added to other protective layers beneath. By creating a stratum of two or more layers of glare shield protection can be made to be sufficient to meet the need of any extreme sunlight situation. When such temporary extreme conditions cease, added layers of glare shield may be removed in the reverse sequence as needed, thusly maintaining a level of protection appropriate for varied conditions of bright light and airborne hazards.

A further embodiment of the invention is to provide glare shields that may be adhered directly to the face without wearing eyeglasses. In this way glare shields can be made to span the recesses of left and right eye socket areas without hindering eyelid movement, thus providing aforementioned protection to those not wearing eyeglasses. This is a particularly needed object for many that do not or can not afford the cost of eyeglasses. Many must live and work primarily out-of-doors. Such is the condition of vast populations living within equatorial latitudes of the world that spend much of the day exposed to the sun without UV protection and many airborne hazards. This embodiment should be considered within the scope and spirit of the present invention.

Figure 4:
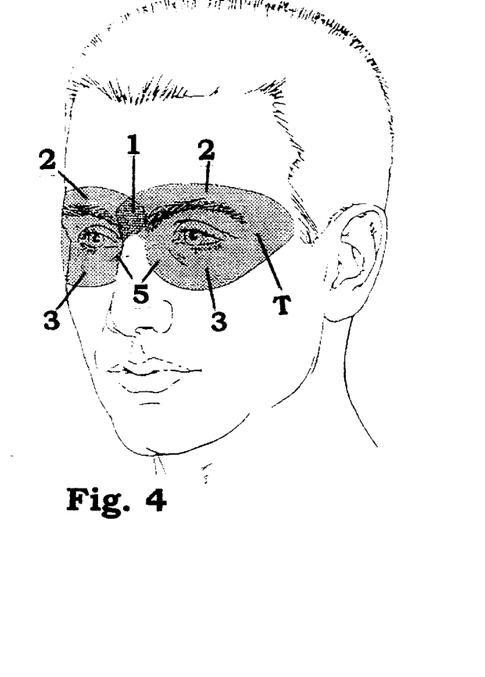
FIG. 4 is a three-quarter facial view of an alternative embodiment of the present invention shown adhered directly to the face of a typical individual without eyeglasses.

Another object of this latter embodiment, illustrated in FIG. 4, is to provide an eye shield that is worn by members of the military when exposed to conditions that may be injurious to eyes or may impair vision. This lightweight, disposable and inexpensive glare shield offers protection against powder-burns from nearby explosions, seals the areas surrounding eyes from airborne hazards that may include toxins and contaminants, reduces the harmful exposure to bright sunlight while deployed in positions, and provides a wide, unobstructed field of vision for better sightings of the enemy. Such glare shields may also be worn by military personnel as a protection against exposure to eyes when submerged in water that contains harmful fluids such as gasoline, hydraulic fluids, oil, and the like.

Another object of the embodiment illustrated in FIG. 4 is to provide an eyeshield that may be worn directly upon the face as shown, and under eyeglasses. This provides sealed protection for eyes, allowing eyeglasses to be also worn by those who wear temporary corrective lenses for close visual improvement and reading only.

Additional benefits and advantages of the invention will become apparent to those skilled in the art to which it pertains upon reading and understanding this detailed specification that should also be considered within the scope and spirit of the present invention.

DETAILED DESCRIPTION OF PREFERRED EMBODIMENT.

Referring now to the drawings wherein the showings are for purposes of illustrating a preferred embodiment of the present invention only and not for purposes of limiting the same.

Figure 1:
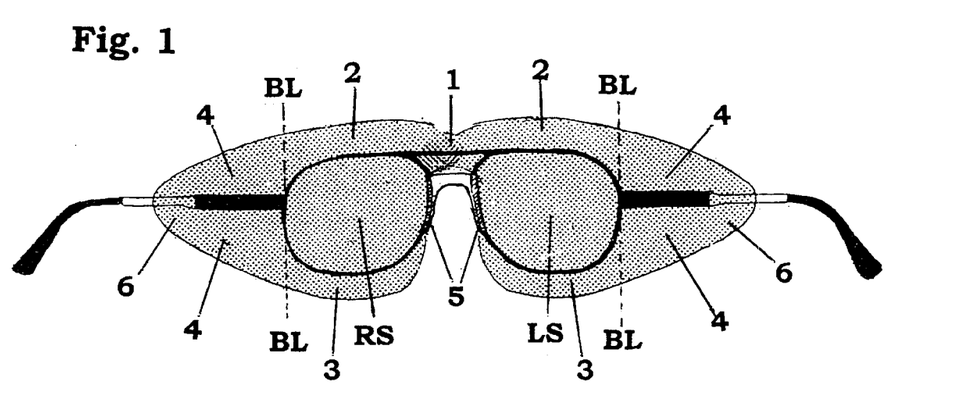
FIG. 1 is a frontal planar view of present invention showing the position of the preferred embodiment mounted overall on a typical pair of eyeglasses.
Figure 2:
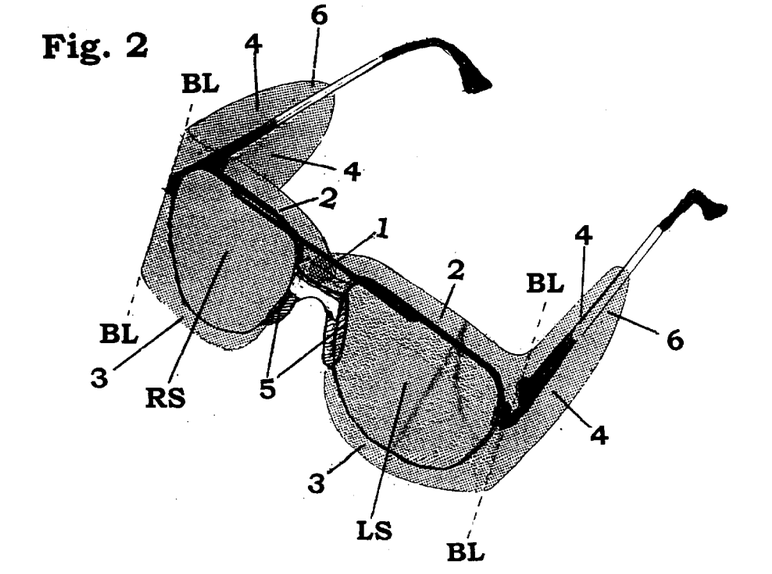
FIG. 2 is a perspective view of the preferred embodiment of the present invention shown attached to a typical pair of eyeglasses.

FIGS. 1 and 2 show a planar view and a perspective view respectively. These illustrate how the present invention covers the exterior of a typical pair of eyeglasses. This present invention consists of two parts, a left side LS glare shield and a right side RS glare shield having mirrored images of one and another. Accordingly, a complete understanding of the construction and use of both left and right glare shields may be had with reference to the following descriptions of either one of them.

FIGS. 1 and 2 show how the present invention completely shields all areas within eyeglass lenses and beyond frames, extending protection to surrounding areas 2 & 3 and to temporal areas 4. A bend-line BL is shown as a dotted line on both left and right glare shields, demonstrating where and how each glare shield is bent around at a right angle to the front of the example eyeglasses. This flexibility of thin plastic film provides sufficient stretch tolerance to allow flexing of eyeglass stems in the course of use.

When needed, glare shields are removed from their convenient folder-container one at a time. Each one is first applied to the exterior of the nose brow area shown as 1 on FIGS. 1, 2, 3a and 3b. It is then positioned at location 5, and with gentle pressure with the thumb or forefinger, it is adhered to the lens and frame at this location so as to eliminate any breach of light that may inadvertently enter at this area if not properly located. When this is completed, again using the thumb or forefinger, the glare shield is gently pressed on to the remainder of the lens, allowing extensions beyond frames at 2 and 3. Then by taking hold of the extreme end of the glare shield at the point identified as 6, attach the glare shield around the sides to cover them so as to be located near the mid-point of the glare shield at 6. Gently press along the frame stems with the thumb to make certain that adhesion is accomplished. If stems are thin or of the wire type, an addition step might be taken for a more secure attachment. Simply, crimp the narrow end of each glare shield at point 6 so that the adhesive side is folded together and in contact around the thin stem. This final step creates a secure bond, suitable for extremes of high wind or sandstorm conditions. It should also be noted that each glare shield is overlapped at the nose bridge at 1 when both are attached.

Figure 3A:
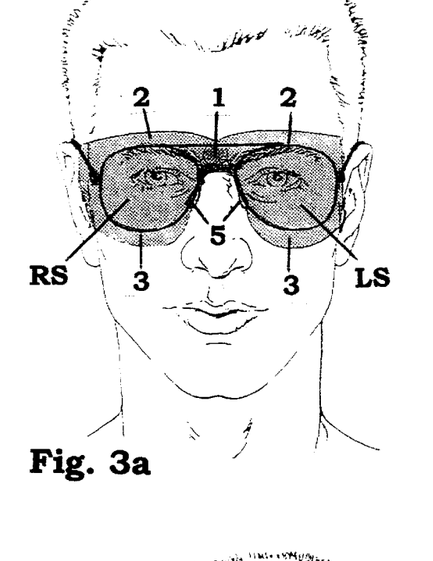
FIG. 3a is a frontal facial view of the preferred embodiment of the present invention attached to a pair of eyeglasses worn by a typical individual.
Figure 3B:
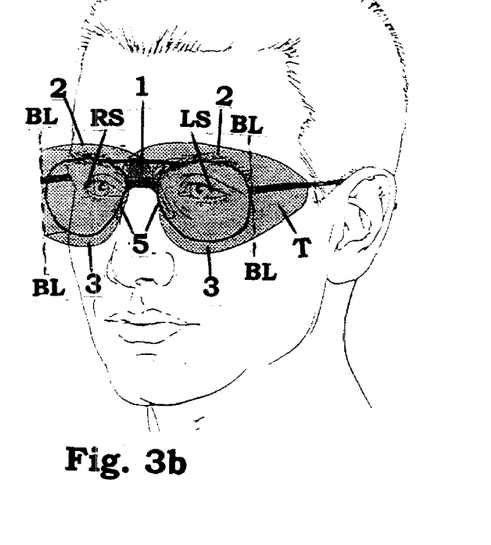
FIG. 3b is a three-quarter facial view of the preferred embodiment of the present invention attached to a pair of eyeglasses worn by a typical individual.
Figure 3C:
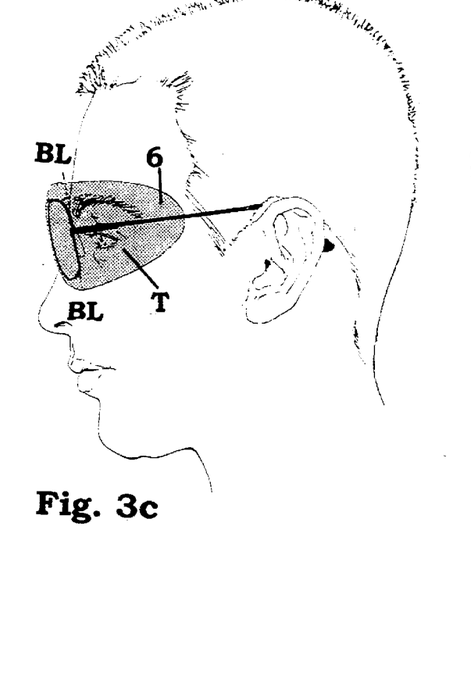
FIG. 3c is a side facial view of the preferred embodiment of the present invention attached to a pair of eyeglasses worn by a typical individual showing the extended shield protection to temporal areas.

FIGS. 3a, 3b and 3c show the present invention adhered to a typical pair of eyeglasses being worn by an example individual. These three drawings show how the preferred embodiment fits securely over the exterior of eyeglass frames. Glare shields overlap at left and right counterpart at the nose bridge area 1 and extend around the eyeglass hinge so as to cover temporal regions T and provide complete and unbroken protection to both wearer's eyes.

FIG. 3a shows a frontal view demonstrating complete protection at extended areas above at 2, below at 3 eyeglass frames, and at temporal areas at T when worn by an individual. An overlap of each glare shield is shown at the nose-bridge, marked 1. This drawing illustrates complete protection beyond the perimeters of eyeglass frames.

FIG. 3b shows a three-quarter view of an individual demonstrating the preferred embodiment's extended protection to temporal areas T, and how the present invention is bent around eyeglass hinges BL allowing adhesion to frame stems. The right side RS of the preferred embodiment being the mirrored image of the left side LS, complete shielding protection of both eyes is provided. These FIGS. 3a and 3b show how complete extended protection is accomplished. They demonstrate how one size and shape glare shield will substantially fit all sizes and shapes of eyeglasses as the result of the extended shielding, as it is not restricted to the size and shape of a particular eyeglass lens. Ample areas above 2 and below 3 will accommodate oversize eyeglass frames. An overlap of left shield LS and right shield RS is shown at location 1. The snug fit at point 5 near the nose-bridge assures that no bright light will by-pass the present invention to invade eyesight.

FIG. 3c shows a left side view of the preferred embodiment adhered to typical eyeglasses, demonstrating the accommodation of a right-angle bend at the eyeglass hinge identified as a dotted line at BL. The right side is the mirrored image of the left side, with both temporal areas T have complete protection from sunlight and other bright light that may enter at the sides if unprotected. Eyes are also protected against strong wind, driven sand, flying insects, and other airborne hazards that might otherwise impact the eyes when not wearing this present invention.

Each side of the glare shield is firmly adhered to eyeglass stems. But, if such stems are thin or of the wire type, the glare shields may be crimped at 6 so that the self-adhesive surface of the glare shield is wrap against itself on the underside so as to create an even greater bond to eyeglass frames.

FIG. 4 shows a three-quarter view of an individual wearing the present invention directly to the face without eyeglasses. Adhesion is accomplished in such a way that seals all areas surrounding the eyes. By first applying the self-adhesive surface of either left or right glare shield to the individual's brow area as shown at 1, and then by gently pressing the glare shield across the region above eyelashes at 2, and thence, by applying pressure to the glare shields at the temporal area shown at T, and continuing this gentle pressure below the eye at 3 and at 5, an adhesive seal around each eye is accomplished.

Eyelids and lashes should normally not come in contact with the self-adhesive under-surface of the mounted glare shields because of the indentation of the eye sockets. But, if it is found that under certain conditions eyelids and lashes do become hindered by the self-adhesive material on the underside of glare shields, a slightly modified embodiment is planned to prevent this from occurring. Simply by eliminating self-adhesive material from an oval area directly in front of each eye, 4 cm. high by 5 cm. wide will allow movement of eyelids and lashes in an unhindered fashion. This modification to the preferred embodiment will allow glare shields to be placed directly upon the face, covering both eyes without any risk of hindering the normal movement of eye lids and lashes, and should be considered within the scope and nature of the present invention. Such modifications have a particularly useful application for vast populations living in remote regions of the world who do not wear eyeglasses and need low cost, disposable shield protection for their eyes..

An additional application of glare shields as illustrated in FIG. 4 can be used by military personnel to reduce the effects of sunlight, glare and other forms of bright light, as well as harmful airborne hazards, toxins and other contaminants. When glare shields are worn directly upon the face to cover eyes, they do not require placement on eyeglass frames. But, if an individual wishes to wear these glare shields directly on their face, they may also wear eyeglasses over the glare shields to provide sealed eye protection and still have the benefit of corrective vision from prescription eyeglasses.

Figure 5A:
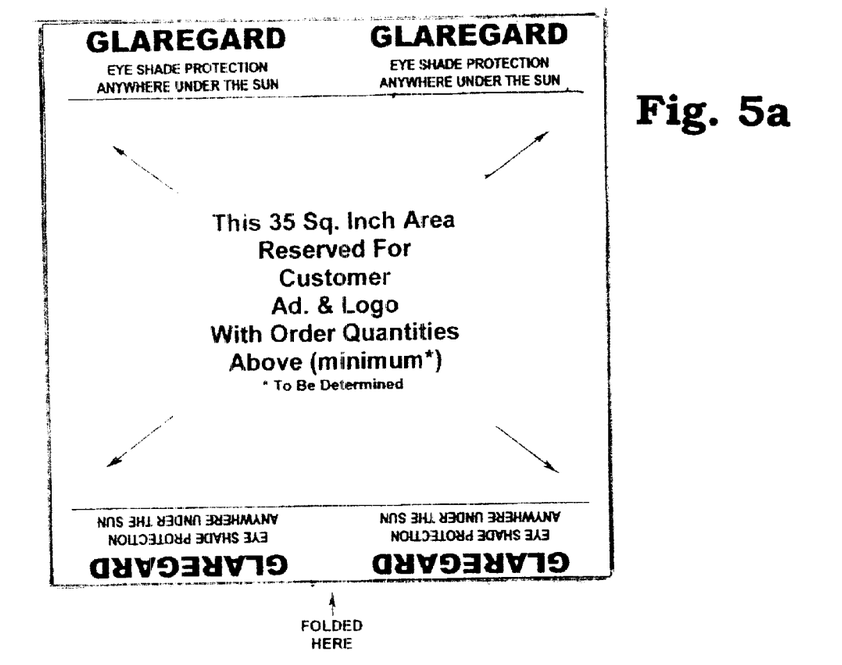
FIG. 5a shows the exterior of a folder-container that stows the preferred embodiment prior to use and after use so that it may be used again.
Figure 5B:
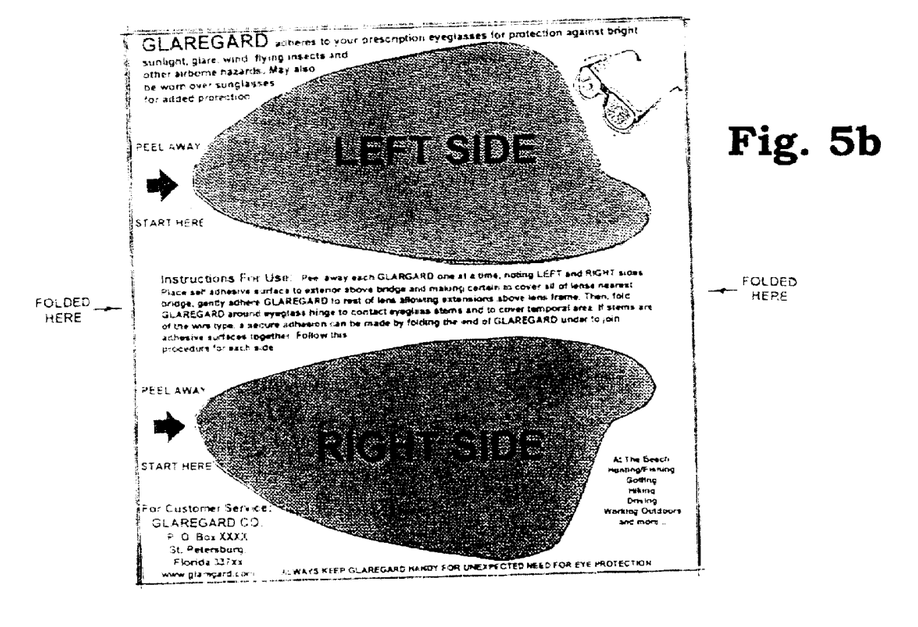
FIG. 5b shows the interior of this same folder-container that stows the preferred embodiment prior to and after its use, coated with a laminated plastic that allows release of each glare shield when needed. Both left and right side glare shields are illustrated.

FIGS. 5a and 5b show respective exterior and interior format for a 7-inch by 7-inch folder/container designed to stow the present invention. When folded, it makes a 3½-inch by 7-inch cover enclosure for left and right glare-shields. The folded size fits within standard shirt and jacket pockets. Since the folder/container is an integral part of the present invention's manufacturing process, a description of both should be included here.

A continuous printing/die-cutting manufacturing process is used when making the present invention and its folder-container. Rolls of suitable paper stock are fed into a continuous printing sequence with the interior of the folder-container being printed first. Standard information concerning the present invention is printed on the interior side, such as Instructions For Use, company name, address, telephone number, email address, and a same-size outline of glare shields designating LEFT SIDE and RIGHT SIDE. After this printing, a thin clear plastic film is laminated to the interior surface. This lamination supplies a release surface for glare shield adhesive when they are positioned upon their outlined locations. The release surface provides a suitable bond for the self-adhesive material on the underside of glare shields, and also allows them to be manually removed when needed and replaced, into the folder/container for future use, again and again if desired, without any adhesive residue being deposited.

The second phase of production of the present invention takes place after sales orders are received. Customer orders require minimum quantities to be of sufficient lot sizes that exceed cost/revenue break-even points, plus a reasonable profit, to permit customized printing of advertising and other information on the cover. An area 5-inch by 7-inch in size located on the folder-container's exterior surface is designated for customer advertising. This 35 square inch area is reserved for customer use, and can contain customized messages such as customer event schedules for sports stadiums, layout of golf courses, services and hours for optometrists and many other specialized announcements.

The invention's product name and a brief description of its use will be printed in four exterior areas, each 1 inch by 3.5 inches positioned on the cover so as to be easily read by others when inserted into a purchaser's standard shirt or jacket pocket. This makes a small "sign" that advertises the present invention that will have a positive impact on sales volume when the glare shield is distributed at major sports events.

During this second phase of printing, glare shields are die-cut and adhered to their preprinted location within the folder-container, which in this final process are cut to the proper size and folded, and packed for shipment to customers. Other economies in manufacturing are expected to emerge and can be considered when consulting with printers with continuous feed/die cutting capacity hired to manufacture this present invention.

In view of the above, it can be seen that the several objects of my present invention are achieved and other advantageous results are attained.

While the present invention has been described and illustrated in its several preferred embodiments, it should be understood that this invention is not to be limited to specific details herein described and illustrated. And as such, I reserve to myself any variation or modification that may appear to those skilled in the art and is within the spirit and scope of the claims that follow.

Having thusly described and illustrated the present invention, I now claim:

1. Temporary glare shield comprising at least one thin flexible plastic film that is self-adhered to exteriors of left side and right side eyeglasses that extend beyond frames to shield peripheral areas above, below and at both temporal sides of eyeglasses so as to completely protect eyes at all surrounding areas from potential bright sunlight, ultra-violet rays, glare, strong wind, flying insects and other airborne hazards.

2. Temporary glare shield as claimed in claim 1, wherein the film is inexpensive and disposable.

3. Temporary glare shield as claimed in claim 1, wherein the film is weight and does not add excessive weight to cause eyeglasses to slide down the wearer's nose.

4. Temporary glare shield as claimed in claim 1, wherein the film easily be manually removed from a convenient stowage folder/container, adhered to eyeglasses when needed, and easily be removed from eyeglasses when temporary need has ended, and either discarded or replaced in the folder/container for future use if desired.

5. Temporary glare shield as claimed in claim 1, wherein the film of one shape and size that substantially fits all shapes and sizes of eyeglasses.

6. Temporary glare shield as claimed in claim 1, wherein the film adhered by a self-adhesive material that has no optical effect upon vision and does not leave any residual adhesive on eyeglass lenses when removed.

7. Temporary glare shield as claimed in claim 1, wherein the film has polarization characteristics that screens out harmful ultraviolet sun-rays and high-intensity light.

8. Temporary glare shield as claimed in claim 1, wherein the film protects eyeglass lenses from damage due to impact of flying objects and contact from objects that may scratch lens surfaces.

9. Temporary glare shield as claimed in claim 1, wherein the film may be adhered to existing tinted sunglasses or may be applied in several layers of glare shield to provide additional protection from extremes of bright light and airborne hazards.

10. Temporary glare shield as claimed in claim 1, wherein the film may be adhered directly to the face of a wearer without eyeglasses so as to completely cover eyes and provide protection from bright sunlight, glare, harmful UV rays, airborne hazards and impact of thorny vegetation that may otherwise come in contact with uncovered eyes.

11. Temporary glare shield as claimed in claim 9, wherein the film that can be worn by military personnel directly upon the face for protection against sunlight, and airborne hazards as well as a shield against powder burns from nearby explosion, concussion, contaminants, toxins employed by the enemy; the film also can provide an improved, uninterrupted field of vision, and do not impair the use of binoculars or other such forms of visual enhancements used by military personnel.

12. Temporary glare shield as claimed in claim 1, wherein the film can be dispensed to patients having eyes dilated ophthalmolgists and other eye care professionals and worn for that period of time when dilated eyes are extremely sensitive to surrounding light.

* * * * *

UNITED STATES PATENT AND TRADEMARK OFFICE
CERTIFICATE OF CORRECTION

PATENT NO.    : 6,557,995 B1
DATED         : May 6, 2003
INVENTOR(S)   : James L. Edwards It is certified that error appears in the above-identified patent and that said Letters Patent is hereby corrected as shown below:

Column 16,
Line 32, reads, "...the film is weight and does not add excessive weight to cause..." is corrected to read, -- ...the film is light weight and does not add excessive weight to cause... --

Signed and Sealed this

Twenty-sixth Day of August, 2003

JAMES E. ROGAN
*Director of the United States Patent and Trademark Office*